Jan. 14, 1947.   L. S. CHAPPELL   2,414,091
APPARATUS FOR MEASURING DEPTH OF WATER
Filed May 17, 1945   2 Sheets-Sheet 1
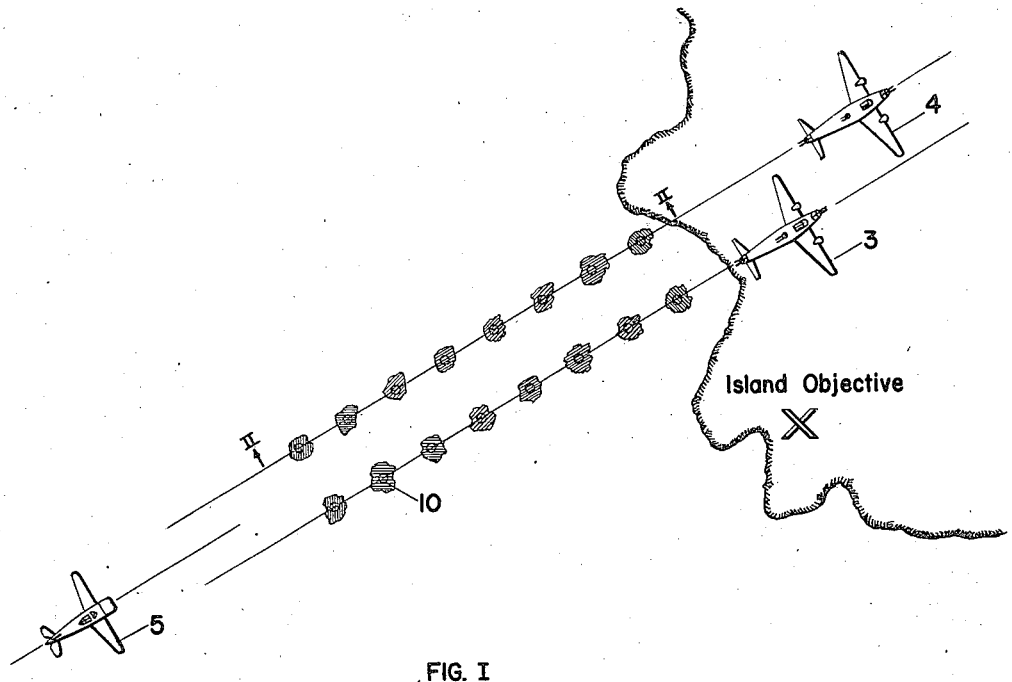
FIG. I
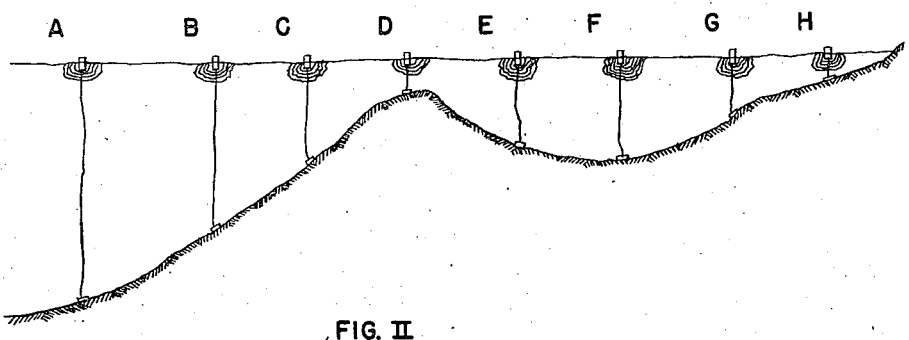
FIG. II
Inventor
Logan S. Chappell
By Ralph L. Chappell
Attorney Jan. 14, 1947.    L. S. CHAPPELL    2,414,091
APPARATUS FOR MEASURING DEPTH OF WATER
Filed May 17, 1945    2 Sheets-Sheet 2
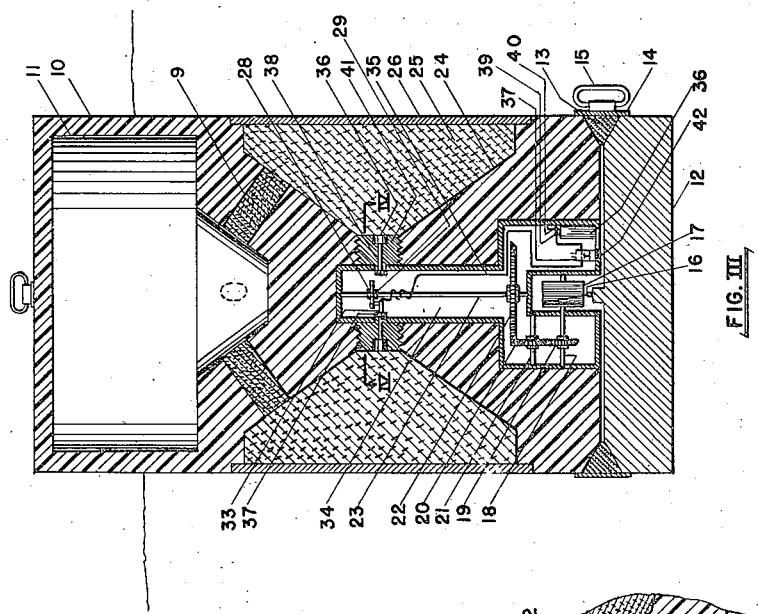
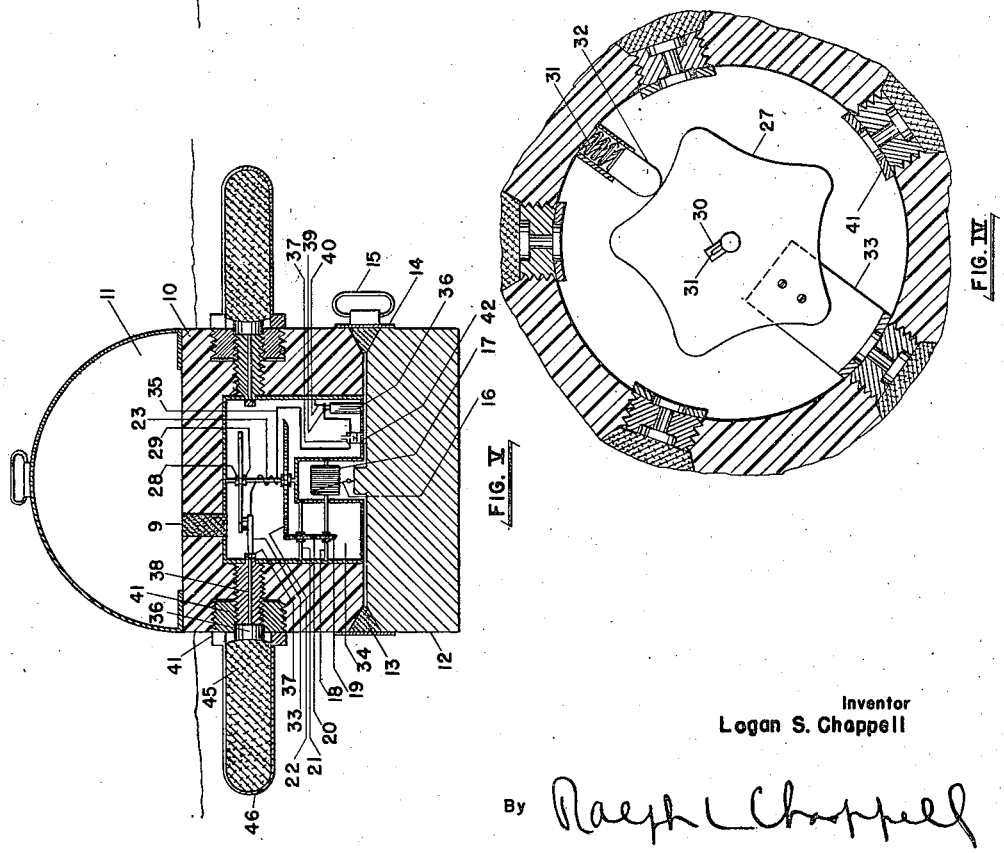
Inventor
Logan S. Chappell
By Ralph L. Chappell
Attorney Patented Jan. 14, 1947

2,414,091

UNITED STATES PATENT OFFICE 2,414,091

APPARATUS FOR MEASURING DEPTH OF WATER

Logan S. Chappell, United States Navy

Application May 17, 1945, Serial No. 594,359

8 Claims. (Cl. 73—290)

(Granted under the act of March 3, 1883, as amended April 30, 1928; 370 O. G. 757)

The invention relates to apparatus for making a water depth study of enemy waters or of waters that are otherwise inaccessible.

This invention is particularly adapted to be used when planning amphibious landings on enemy territory since it is most important to know the depth of water immediately adjacent to the proposed landing area.

It is a primary object of this invention to provide apparatus for obtaining soundings in spite of the enemy's efforts to prevent same from being obtained.

It is a further object to provide apparatus for taking soundings by utilizing aircraft to carry the depth indicating devices above the water in question, and dropped therein to form any pattern desired and later flying over the area to obtain the information desired.

It is a still further object to provide an apparatus that will indicate the depth of water by discharging an identifying dye that is visible from a distance.

In the accompanying drawings, forming a part of this specification, and in which like numerals are employed to designate like parts throughout the same, wherein:

Fig. 1 is a diagrammatic view illustrating the manner of obtaining soundings in beach reconnaissance;

Fig. 2 is a section taken along 2—2 of Fig. 1 showing the depth indicating bombs upon operation;

Fig. 3 is a cross section in elevation of the depth indicating bomb;

Fig. 4 is a section taken along 4—4 of Fig. 3; and

Fig. 5 is a cross section in elevation of a modification of the invention.

In the drawings, Figs. 1 and 2 illustrate the manner of obtaining soundings of the water approach adjacent to the objective X. The two aeroplanes 3 and 4 have just completed their function of dropping over the side from low altitude a number of depth indicating bombs 10 in a predetermined pattern. In this case a track pattern is shown though any pattern or dispersal of units may be used. The units 10 have operated as is hereinafter described in full detail so that each unit has discharged or ejected a distinctive dye forming color patches indicating the depth of water. After a predetermined time interval from the placing of the units in the water another plane 5 carrying photographic equipment flies over the area and takes a colored photograph of the area which is now covered with color patches. This film when developed and printed gives an accurate estimate of the depth of the water approach to the island objective which can be obtained by an analysis of the color patches. A profile of the bottom as shown by Fig. 2 can then be reproduced and studied.

As shown, the different depths of water cause the individual depth indicating devices 10 to discharge a distinctive dye, a different color for every three feet of depth. For example, as shown by Fig. 2, the depth indicating device A discharged a distinctive dye #5 indicating a depth of water of about 15 feet, device B discharged a dye #4 indicating a depth of about 12 feet, device C discharged a dye #3 indicating a depth of about 9 feet, device D discharged a dye #2 indicating a depth of about 6 feet, and so on, to device H which discharged a dye #1 indicating a depth of 3 feet or less. The colors used are those basic colors such as blue, red, green, yellow, etc., that are discernible at a distance. The dye used is one which floats on the surface of water and remains thereon as a patch for a relatively long period of time. Even in those cases where the depth of water is known to the military officials planning the landing, a knowledge of the exact depths of the water would indicate traps or obstacles placed in the water by the enemy to forestall a landing.

Now referring to Figs. 3 and 4 which show a preferred embodiment of the invention, the depth indicating device consists of a cylindrical body 10 made of light weight material having in its top portion an air chamber 11 for the purpose of giving the unit buoyancy in water. At the base of the unit 10 there is a cast iron anchor 12 removably mounted by means of the water solvent binder 13 interposed between the anchor 12 and the body 10 at their circumferences. To prevent the deterioration of the binder 13, a waterproof gummed safety tape 14 is wound over the binder 13. A handle 15 connected to one end of the safety tape 14 is provided to facilitate the removal of the tape.

A line or cable 16 which is wound about the drum 17 has one end attached to the anchor 12 and the other end free or attached to the drum 17. Since this device can be used to measure any depth of water, any length of line may be utilized. However, in this embodiment, 15 feet of line is used, inasmuch as knowledge of accurate depths of water less than 15 feet is vital in planning amphibious landings. The drum 17 is fixedly mounted on the rotatable shaft 18 which has a gear wheel 19 mounted at one end. An idler gear wheel 20 rotatably mounted on the shaft 21 is interposed between the gear wheels 19 and 22. The gear wheel 22 is mounted on the shaft 23 which carries a dye selective mechanism.

The dye selective mechanism consists primarily of a spring loaded star-like ratchet 27, as shown, loosely mounted on the shaft 23 and fixed in position by the two nuts 28 and 29. A slotted portion 30 in the ratchet 27 permits the pin 30' and the shaft 23 to which the pin 30' is fixed, to have a limited relative rotative motion with respect to the ratchet 27. A detent 32 upon which a tension spring 31 exerts a constant force so that the rounded portion of the detent 32 constantly bears on the arcuate faces of the ratchet 27, permits the latter to turn in abrupt step as the gearing mechanism 19, 20, 22 and 23 rotates smoothly. The ratchet 27 carries the dye selector 33 which is an electric contact making member, and consequently is electrically insulated from the ratchet 27. The contact member 33 has a wire 35 connected at its unengaged end, which wire extends to one pole 39 of the battery 44 with a break in the circuit where the wire enters the chamber 37. The free ends of the wire 35 are separated from each other in the chamber 43 which has an air vent at the top and a water solvent plug 42 sealing off the lower portion of the chamber. The other pole 49 of the battery 36 is grounded on the unit 10.

Disposed about the mid portion of the unit 10, a plurality of cone shaped cavities 24 are symmetrically arranged. Any number of said cavities may be used though the embodiment shown has 5 such cavities. Into the cavities 24 are placed a color charge 25, each color being different and indicative of a certain depth of water. At the outward or exposed sides of the color charges 25 are cover plates 26 fixed to the unit 10 so that the dye cannot leak out nor water be permitted to find its way into the unit after the device is launched and before one of the color charges is ejected.

Arranged symmetrically about the chamber 34 on the inner sides of the color charge cavities 24 are the threaded members 41 which contain a powder charge 36 and an electrically operated primer 37 interconnected by a passageway 38. The outer end of the contact member 33 constantly engages one of the electrically operated primers.

The top portion of the depth indicating unit 10 consists of a large air chamber 11 whose purpose is to give the device positive buoyancy after the anchor 12 has separated from the unit 10. A plurality of passageways 9 filled with a water solvent plug extends from the air chamber 11 to each of the conical cavities 24. Since it is most desirable to have the units sink after operation in order that they do not get into the hands of the enemy, one of the water solvent plugs in the passageway 9 becomes exposed to the water after the dye has been ejected from the unit, becomes dissolved, and permits water to enter the air chamber 11 causing the unit to sink.

Fig. V shows a modification of the invention. In this device a color cartridge 46 which contains a color capsule 45 is secured at its open end to the member 41 in any suitable manner. This device is in all other respects similar to the preferred embodiment though it is more compact and simpler in construction.

In the normal operation of the device, the gummed safety tape 14 is first stripped off, thus exposing the water solvent binder 13. The device is then thrown out of a low flying plane and into the water where it immediately sinks to the bottom because of the heavy cast iron anchor 12. The water acts on the water solvent binder 13 to dissolve same. As soon as the binder 13 is dissolved, the anchor 12 and the unit 10 become separated. Since the unit 10 has positive buoyancy, it begins to rise to the surface, paying out the line 16 which is attached to the anchor 12. As the drum 17 rotates the gearing mechanism 19, 20, 22 operates, causing the shaft 23 to rotate. As the shaft 23 begins to rotate, the ratchet wheel 27 remains stationary; the pin 31 advancing in the slot 30 until it arrives at the edge of the slot and causes the ratchet 27 to rotate against the spring pressure exerted by the spring 31 against the detent 32 until the ratchet has turned sufficiently for the detent 32 to slide past the high point of the ratchet 27 into the low point. The ratchet 27 carries the contact member 33 which, as the ratchet moves in steps, moves from its contact position of one primer 37 to the next since the ratchet rotates in steps equal in distance to the distance between the threaded members 41 carrying the primers 37. The preferred embodiment shows five color charges with the gear mechanism so arranged that as the unit pays out each 3 feet of line, the contact member 33 moves to the next primer 37. With this construction, a discharge of color #1 will indicate water less than 3 feet deep, color #2, from 3 to 6 feet, color #3, 6 to 9 feet, color #4, 9 to 12 feet, color #5, 15 feet, or more.

As the unit is rising in the water, the water soluble plug 42 which is now exposed to the water begins to dissolve but does not become completely dissolved until sufficient time to permit the unit to rise at least 15 feet under normal conditions. Upon the complete dissolution of the solvent plug 42, water enters the chamber 43 and forces a resilient closure member within the chamber 43 upwardly, carrying along any contact making member into contact relation with the exposed contacts that form the break in the circuit, thus closing the electric circuit permitting current to flow from the battery 44 to the contact member 33 and then to the primer in contact therewith. The electric current sets off the primer in the threaded member 41, causing the main charge 36 to explode and blow out the dye 25 in the cavity 24. The dye then floats and remains on the surface of the water, thus indicating by its distinctive color, the depth of water there below.

While the preferred embodiment of the invention has been shown for purposes of illustration, it is to be clearly understood that various changes in details of construction and arrangements of parts may be made without departing from the scope of the invention as set forth in the appended claims.

The invention described herein may be manufactured and used by or for the Government of the United States of America for governmental purposes without the payment of any royalties thereon or therefor.

What I claim is:

1. In a device for measuring the depth of water comprising a buoyant body, an anchor member removably secured to said buoyant body and connected thereto by means of an extensible line, a plurality of depth indicating means in said buoyant body, and selective means activated by said extensible line to selectively release one of said depth indicating means.

2. In a device for measuring the depth of water comprising a buoyant body, an anchor member removably secured to said buoyant body and connected thereto by means of an extensible line, a plurality of depth indicating means in said buoyant body, selective means activated by said extensible line to selectively release one of said depth indicating means, and water soluble means contained in said buoyant body for destroying its buoyancy after exposure to water.

3. In a device of the class described comprising a unit having positive buoyancy, an anchor removably attached to said unit, a plurality of color charges contained in said unit, means for discharging said color charges, selective means operably connected to said anchor for operating one of said color discharge means to indicate the depth of water.

4. A construction as set forth in claim 3 with the provision of a further means in said unit operable to destroy the positive buoyancy of said unit.

5. In a water depth measuring device, the combination of a main body having positive buoyancy, an anchor removably attached to said main body, a drum carried by said main body, a line attached to said anchor and wound about said drum, a gear wheel mechanism operably connected to said drum, spring loaded ratchet means operably connected to said gear mechanism, a plurality of distinctive dye color charges contained by said main body, means for discharging the dye charges mounted in said main body, contact means carried by said ratchet means in contact relation with said discharge means, and means for operating the discharge means by energizing the contact means to discharge a dye charge at a predetermined time interval after the device is placed in the water.

6. A construction as set forth in claim 5 with the provision of an additional means in said main body operable on contact with water to destroy the positive buoyancy of said main body.

7. A device of the class described, comprising a unit having positive buoyancy, an anchor, water solvent binder means interposed between said anchor and said unit at their outer edges, a drum carried by said buoyant unit, a line attached to said anchor and wound about said drum, gear wheel assembly operably connected to said drum, a rotatable shaft connected to said gear wheel assembly, spring loaded ratchet means rotatably mounted on said shaft for step by step rotation, a plurality of distinctive dye color charges contained in said unit, a plurality of threaded members mounted adjacent said color charges, main powder charges in said threaded members to discharge one of said dye charges, electrically operated primer charges for setting off said main powder charge, a contact member carried by said ratchet means in constant contact with one of said primer charges, electric conduit means connecting a battery to said contact member there being a break in said electric conduit means, a water solvent plug adjacent said break permitting ingress of water to close said circuit after a predetermined interval of time.

8. A construction as set forth in claim 7 with the provision of an air chamber in said unit, a water solvent plug sealing said air chamber and exposed to the water upon operation of the device to cause said unit to sink.

LOGAN S. CHAPPELL.